(No Model.) 4 Sheets—Sheet 1.

W. B. POLLOCK.
GARMENT MEASURING AND FITTING DEVICE.

No. 320,496. Patented June 23, 1885.

WITNESSES:
Gustave Dieterich
Fred Huetwohl

INVENTOR
William Bloomer Pollock.

(No Model.)  4 Sheets—Sheet 2.

W. B. POLLOCK.
GARMENT MEASURING AND FITTING DEVICE.

No. 320,496.  Patented June 23, 1885.

WITNESSES  
Gustave Dieterich  
Fred Huetwohl

INVENTOR  
William Bloomer Pollock

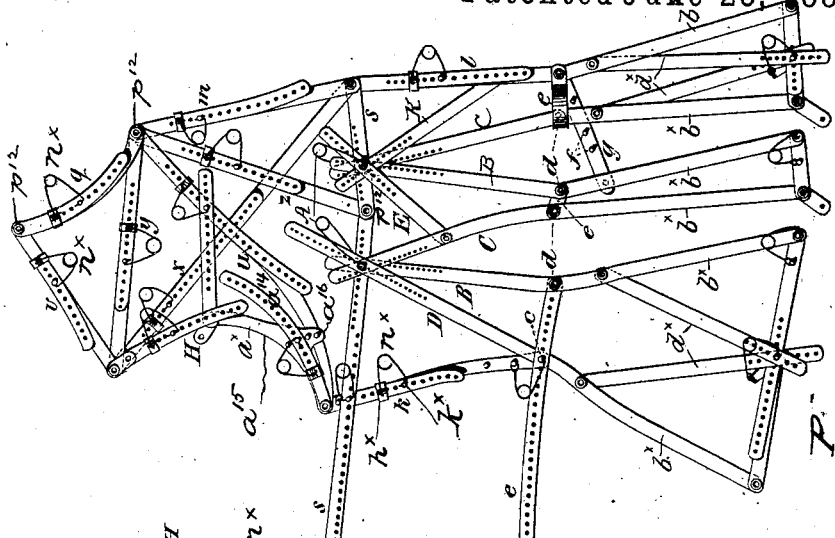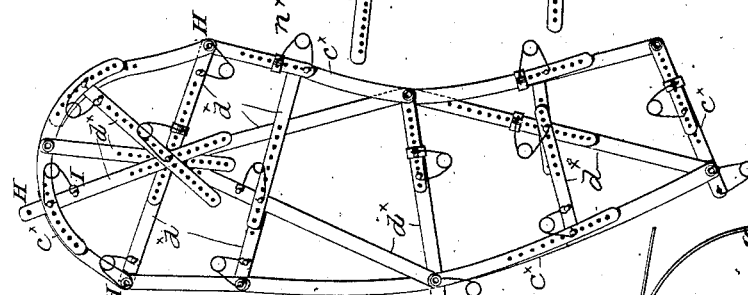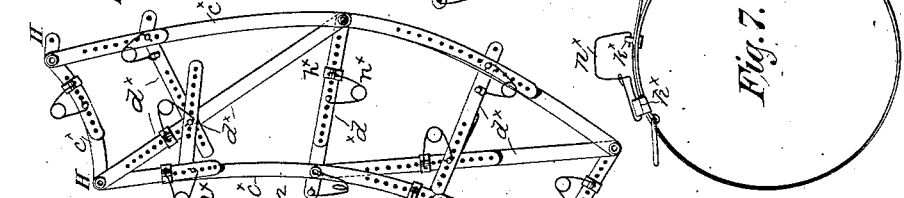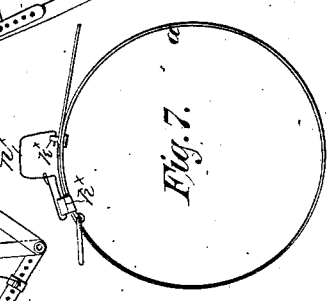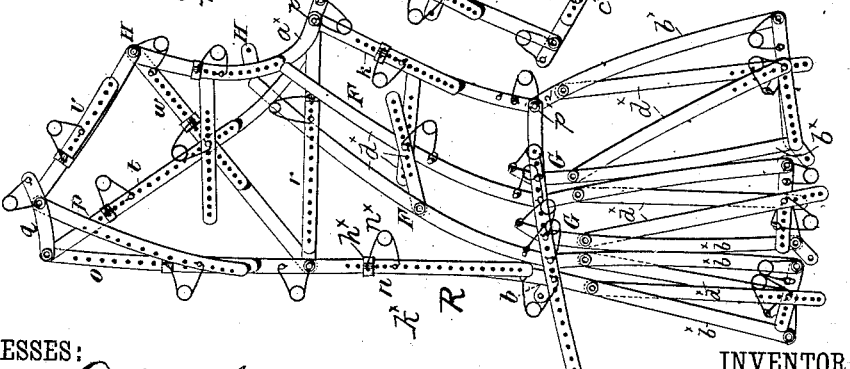

(No Model.)  4 Sheets—Sheet 4.

W. B. POLLOCK.
GARMENT MEASURING AND FITTING DEVICE.

No. 320,496.  Patented June 23, 1885.

WITNESSES:
Gustave Dieterich
Fred Huetwohl

INVENTOR,
William Bloom Pollock

UNITED STATES PATENT OFFICE.

WILLIAM BLOOMER POLLOCK, OF PHILADELPHIA, PENNSYLVANIA.

GARMENT MEASURING AND FITTING DEVICE.

SPECIFICATION forming part of Letters Patent No. 320,496, dated June 23, 1885.

Application filed January 14, 1884. (No model.)

*To all whom it may concern:*

Be it known that I, WILLIAM BLOOMER POLLOCK, of the city and county of Philadelphia, State of Pennsylvania, have invented a new and useful Improvement in Garment-Fitting Devices for Garment - Cutting, of which the following is a sufficient description, reference being had to the accompanying drawings, forming part of this specification, in which—

Figure 1:
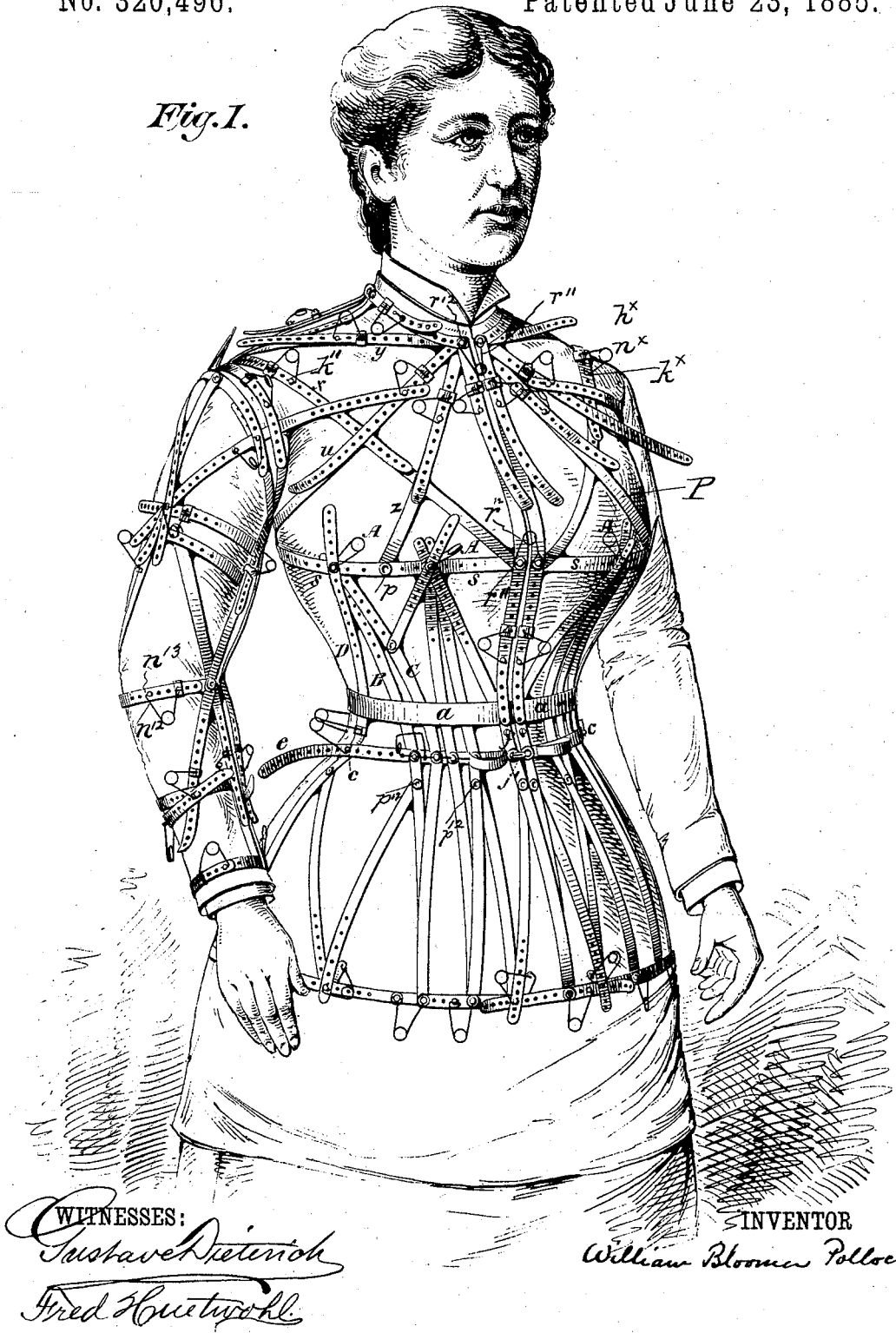
Figure 2:
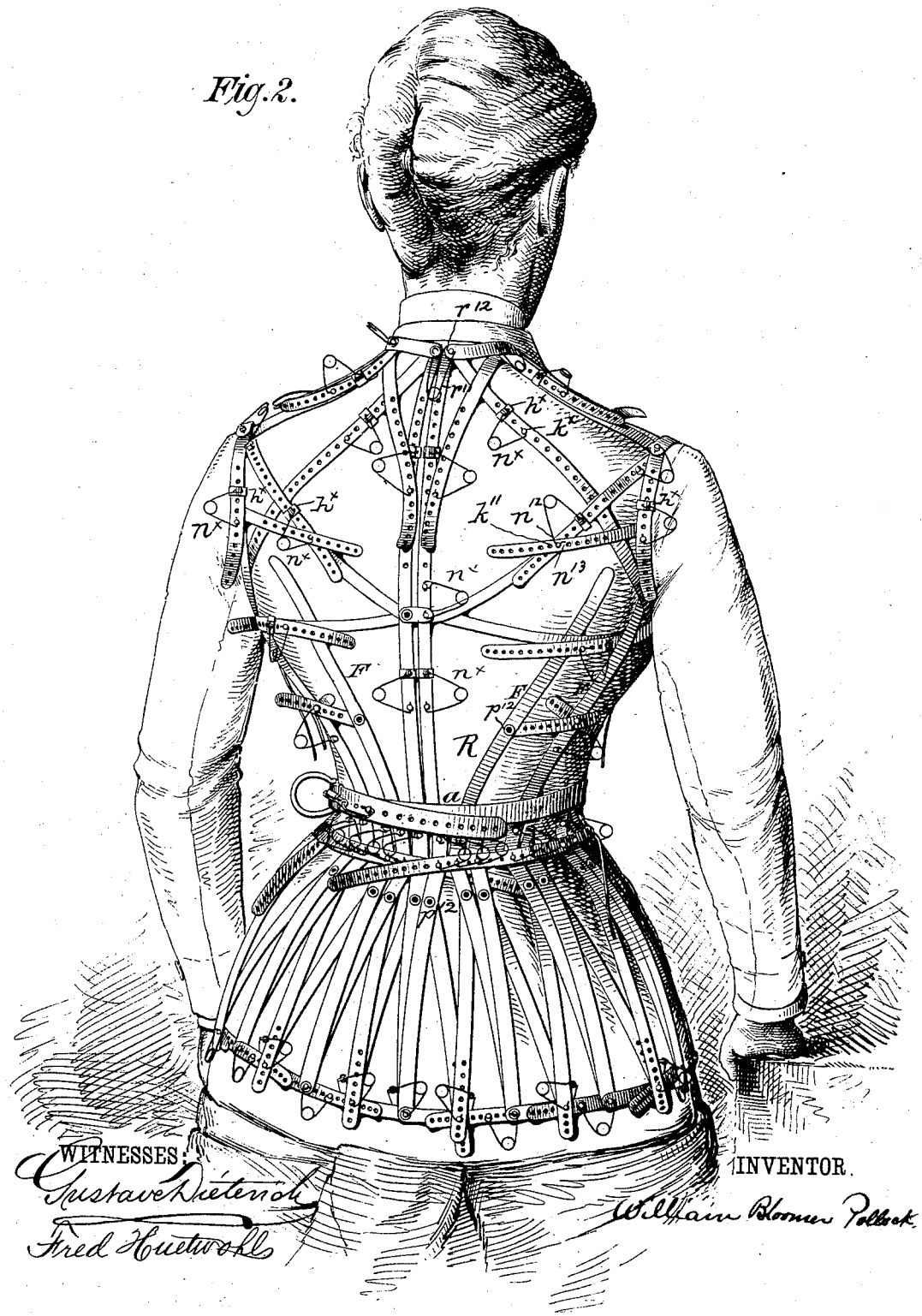
Figure 8:
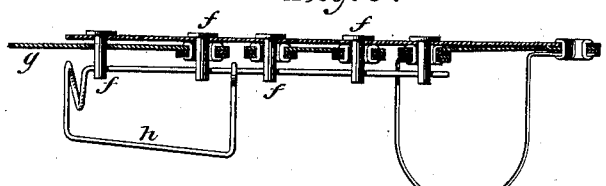
Figure 9:
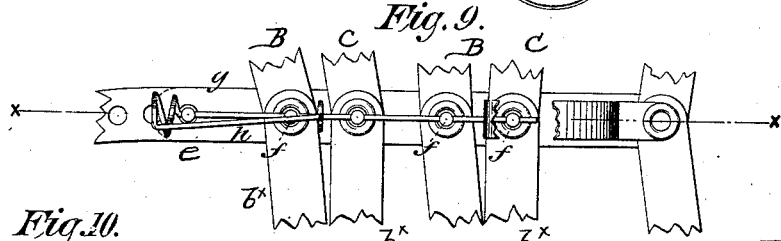
Figure 10:
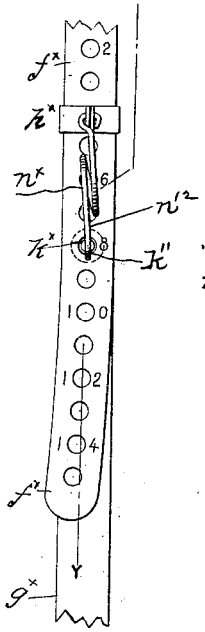
Figure 12:
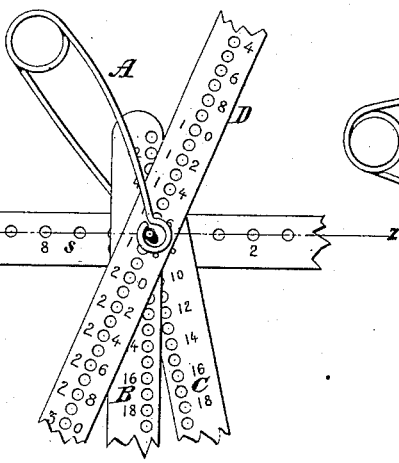
Figure 11:
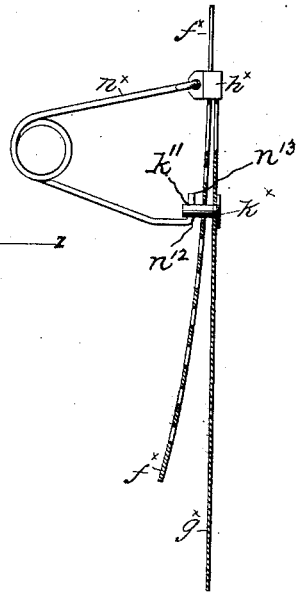
Figure 13:
Figure 14:

Figure 1 is a front view of body-and-sleeve form of fitting device embodying my invention, and shown applied to a woman's figure. Fig. 2 is a rear view of same. Fig. 3 is a plan view of one of the duplicate back sections or frames of the fitting device, said section being shown flat or in its position to take or mark a pattern therefrom. Fig. 4 is a like view of the under section for the sleeve-frame. Fig. 5 is a like view of the upper section of the sleeve-frame. Fig. 6 is a like view of one of the duplicate front sections or frames of the fitting device. Fig. 7 is a plan of the belt and spring-fastening device therefor to be used in connection with the fitting device. Fig. 8 is an enlarged broken detail section of the waist and dart straps and spring-fastening device to be used therefor. Fig. 9 is an elevation of same. Fig. 10 is an enlarged broken detail elevation of overlapping straps, showing loop, stud, and fastening-spring to hold the straps in their adjusted positions. Fig. 11 is a vertical section of same. Fig. 12 is a broken elevation of bust and ends of dart-straps and fastening-spring and studs. Fig. 13 is a side elevation of the fastening-spring shown in Figs. 12 and 14; and Fig. 14 is a sectional view of same on line *z z*, Fig. 12.

My invention has relation to garment-fitting devices of that form, composed of detachable sections or frames, which are first fitted to the person and then laid out flat upon the fabric from which the pattern or outline of the parts of the garment is to be cut. These fitting devices as they have heretofore been made are open to two disadvantages which seriously cripple their usefulness, to wit: first, that only partial fitting can be made by the devices when fitted to the person; the darts, gores, seams, and other parts not then fitted or provided for are calculated by the skill of the operator when the fitting device is laid out upon the fabric to be cut; second, that the movable strips composing the fitting devices are held in their adjusted positions by thumb-screws and nut-fastening mechanism, which is liable to and frequently becomes disarranged during the manipulation incident to fitting the device upon a person, removing it therefrom and laying it upon the fabric. Such disarrangement, it is obvious, varies the adjustments of the parts of the device and produces a misfit. My invention avoids these disadvantages, and has for its object to produce a garment-fitting device which will give the fit of every seam and dart to be made, and locate the darts and gores to be put in the garment, and which, when fitted, retains its adjustment during the manipulations incident to fitting and marking the pattern or fabric to be cut, whereby a perfect fit is invariably and mechanically made without requiring any skill or calculation on the part of the operator or fitter.

My invention accordingly consists of a garment-fitting device composed of separable front and back, or a number of flexible and separable sections or frames, each of which is made up of strips or straps of thin metal or other suitable flexible material, part of which straps are single straps having openings or perforations adapted to engage with studs located upon other straps, and the remaining straps are composed of two overlapping straps, either or both of which have a series of openings or perforations. One strap of each pair of overlapping straps has a stud which is in line with and passes into any one of the openings of the other strap of the pair. All of said straps for a section or frame have a permanent pivotal or swivel connection one with the other, to allow the section to be adjusted in any and every desired way or direction, and they also have sliding or adjustable loops provided with spring-pins, which pins engage with the studs and openings of said overlapping straps; and, further, they have other spring-pins for engagement with the studs to which the single straps connect, for securely and positively fastening all of said straps in the positions to which they may be adjusted, and locking and maintaining them in such adjusted position during all the manipulations to which they may be incident when the fitting device is removed from a person and its sections or frames taken apart and placed upon a flat surface for obtaining or marking a pattern therefrom.

The various straps of the frames or sections of the fitting device are straight or curved, or have a combination of straight and curved lines to give every seam in the garment desired.

The various drawings show the construction of my device in its most difficult form, that for tight-fitting dresses or basques for women being composed of two duplicate front and two duplicate back sections or frames, P P and R R, respectively, each of which is independent of the other, and is adapted to be connected to and disconnected from the other sections. Each section or frame is made up partly of overlapping sectional or pairs of straps and partly of single straps, as shown. One strap of each pair of overlapping straps has openings or perforations, as indicated, which may be numbered or marked, as shown in Figs. 10 and 12, as desired, and the one end of the other strap of same has a keeper or loop, $h^\times$, (seen more plainly in Figs. 10 and 11,) a stud, $k^\times$, provided with a lateral opening, $k^{11}$, and locking-spring $n^\times$, fastened at one end to keeper $h^\times$, and having at its other end a bend, $n^{12}$, to form a pin or catch, $n^{13}$, for engagement with opening $k^{11}$ in stud $k^\times$, to positively and securely fasten said strips when adjusted, and maintain such adjustment under any of the manipulations, as hereinafter described, to which said sections are subjected, so that said adjustment cannot be accidentally or otherwise disturbed, except by manually releasing the spring-pin $n^{13}$ from stud-hole $k^{11}$.

The single straps of the sections or frames have a series of openings, as shown, for engagement with studs $k^\times$ on other straps. All the single and overlapping straps of each section are pivoted at their ends, one with another, by preferably hollow eyelets $p$, so that the straps of a frame are permanently pivoted together, are susceptible of adjustment in different directions, and when adjusted are securely locked together, and such adjustment is duly maintained until purposely broken.

The sections are connected together to form the fitting device by means of a hook, $j'$, (see Fig. 1,) which passes into an eyelet on one of the straps of the adjacent section, and by spring-catches $r^{11}$, one end of which is fastened to a strap-stud of a section, and the other end has a pin, $r^{12}$, to engage with a strap-stud, $k^\times$, upon another or adjacent section or frame. (See Fig. 2.)

The sections or frames, constructed as described, when connected together form a fitting device the sections of which are adjustable longitudinally as well as laterally, so that the fitting device can be adjusted, as hereinafter described, for obtaining different lengths—i. e., from neck to bottom of basque—and different chest or body measures—i. e., around the chest or body.

In adjusting these straps, when the proper adjustment is obtained one of the holes in the strap having holes is put over the stud in the stud-strap, and the spring that is fastened to the loop in the stud-strap is put through the stud, and the adjustment is thereby secured until it is desired to use it on another person.

All the holes in the various straps are numbered, in order that both sides of the fitting device—i. e., the right side and the left side—can be adjusted alike, and in order that a record of the adjustments for any person can be kept, if desired. Other advantages in having the holes numbered will become apparent further on.

When all the adjustments in the fitting device are made and secured by the several fastenings provided for that purpose, it is impossible for it to change in shape, as it will be seen that the plan of connecting and arranging the straps of each section of the fitting device is to connect or pivot the straps in series of triangles or triangular arrangement. For instance—

The strap $q$, in Fig. 6, from the side neck to the neck at front is one side of a triangle, the strap $v$ from the side neck to the shoulder-tip is another side, and the strap $y$, from the shoulder-tip to the neck at front, is the third or last side. The same arrangement will be found throughout the entire fitting device. This triangular arrangement of the straps secures firmness and accuracy of adjustment to the desired degree. Any strap in the fitting device can be changed independent of the others, and the device as a whole will allow of any possible adjustment for any human figure within the limits of the several straps.

In the device intended for close-fitting garments for women, it is necessary to have some independent and universal way of adjustment at the darts. This I accomplish as shown most clearly in Fig. 12. The device for girls' and boys' clothing will be made similar, though smaller than those for adults. Those for women would comprise one for dresses and basques, and another for cloaks. Those for men, one for coats, one for vests, one for trousers, and one for shirts.

As garments are made by the methods now in vogue, the most difficult garment to make is a tight-fitting dress or basque for a woman, and for that special reason I have in my drawings shown my devices for that particular work, as the explanation applies equally well to all the other styles.

In the operation of my device for women's tight-fitting clothing I proceed as follows: The belt $a$, Fig. 7, is put around the woman's waist at the smallest part and drawn up as tight as she desires her dress to be. While doing this her wishes should be consulted in all cases, as the dress will be exactly as tight as the belt is made during this operation. When the desired tightness is determined, the belt is removed, and the four waist-adjustments on the four waist lines or straps at $b$, in Fig. 3, and $c$, in Fig. 6, are set to the holes numbered the same as the hole in the belt that was used to determine the tightness of the waist when it was on the woman. The waist-straps $e$ of the front sections at the darts are now closed by putting the eyeleted holes $d$ in the waist-straps $e$, over the five studs $f$, (see Figs. 8 and 9,) in the keeper-strap $g$, as shown in Fig. 6, where the waist-line at the darts is open, and in Fig. 1, where they are closed. This keeper-strap $g$, with the five studs $f$ referred to, is pivoted to the waist-line at $j$, Fig. 1, so that it will turn out of the way in marking the pattern. Fig. 6 shows it partly turned out of the way. After the waist-straps $e$ are put on this strap $g$, the fastener $h$ is put through the studs and locked. (See Figs. 8 and 9.) The two backs of the device, Fig. 3, are now put together and fastened at the neck, at the center of the back, and lastly at the waist-line. Then the two fronts, Fig. 6, are fastened together at the neck and at the bust only, leaving the hook-fastening $j'$, Fig. 1, at the waist-line open. The front of the device is now joined to the back part by the fastenings on the left side, first at the neck, then the shoulder-tip, then under the arm, and lastly at the waist-line at the hips. The device is now ready to put on the person to be fitted. I leave all the skirt-fastenings at the bottom of the skirt loose until I get ready to adjust the skirt. While I hold the device up to the woman she puts her left arm through the left armhole, and I fasten the device on her at the side neck on her right side, (the several adjustments of the device having been made large enough to admit her body before it was put on her, this being necessary only in cases where the device was previously on a smaller person.) I next fasten the right shoulder tips, then under the right arm, then at the waist, then at the right hip, and lastly the waist-line in front by the hook-fastening $j'$, Fig. 1. I then put the belt around her at the smallest part of her waist and above the waist-line of the device. The belt is drawn up to the hole indicated at the several waist-lines or to the same hole that it was formerly drawn up to. As the belt is now outside of the device, it may be a little too tight for comfort. If so, it can be loosened a hole or two; but the tighter it is the better the device is held in place while being adjusted, the belt being put on simply for the purpose of holding the device in its proper place, and the tightness or looseness of the belt during this use of it having nothing whatever to do with the feeling or fit of the garment. I now adjust the device by beginning at the up and down straps $k$, that run from the waist at the right hip to under the arm. After I have secured the desired length or adjustment of them, I adjust the same straps on the left side of the device to the same hole as I adjusted those on the right side. Should I find that such an adjustment was not right for the left side of the woman, I then realize that the right and left sides of the person are of different proportions and require adjustments independent of each other. In all cases the adjustment of any one strap on one side of the device must be as followed by the adjustment of the corresponding strap on the other side. It will not do to adjust all the right side of the device first and then adjust the left side, or vice versa. The adjustments must be made in systematic order. After the under-arm adjustments are secured I adjust the up and down straps $n$ at the back, that run from the waist-line to the center of the back, then the straps $o$ from the center of the back to the back neck, and then straps $p$ from the side neck to the back. Then I adjust the up and down straps $l$ that run from the waist-line in front to the bust, then straps $m$ from the bust to the front neck. The next adjustment is the straps $q$ running around the neck. When these are all properly adjusted, I adjust the straps $r$ running from the center of the back to under the arms, then the straps $s$ in front from bust to under the arm, then straps $t$ from the back neck to under the arms, then straps $u$ from front neck to under the arms. The next adjustments are the straps $v$ running from the side neck to the shoulder-tips, then straps $w$ from back shoulder-tip to center back, then straps $x$ from front shoulder-tip to bust, then straps $y$ from front shoulder-tip to front neck. I then adjust the strap $z$ that runs from the front neck to the bust-line, the stud-strap of which is pivoted to the bust-line where the bust-line is jointed. The darts and armhole are now to be adjusted. If the adjustments of the right and left sides of the device have been exactly the same up to this point, then I need only adjust the darts and armhole on one side of the device, as in cutting the garment only one side of the device need be used. I adjust the darts as follows: Always beginning with the back dart, (the one nearest the arm,) first I take one of the independent springs A, (shown in Fig. 13,) and when I have decided as to where I want the point or upper end of the dart to come on the bust-line I put the stud end of the spring through the small hole in the bust-line at that point, and put the back strap, B, of the dart on the spring, then the front strap, C, and then the dart-brace D, that runs from the waist-line at the hip, and then clasp the spring. The front dart is adjusted in a similar manner, and an additional brace, E, that runs from the front strap, C, of the back dart is put on the spring that holds the front-dart adjustment. The armhole is now adjusted, first at the back, and then in front.

The waist-line and all above it is now adjusted, except the side seams, F, in the back, (the side seams, G, on the waist-line having been located before the device was put on the woman.) The side seams, F, can be adjusted while the device is on the person, or after it is taken off, as the operator desires. The skirt is now to be fastened and adjusted, first, at the front, then at the back, finishing up at the sides. The skirt-straps $b^\times$ and braces $d^\times$ are adjusted last, or otherwise, as desired. When all the above-mentioned adjustments are made, the sleeve, Figs. 4 and 5, is closed and fastened to the armhole of the body device at H, Figs. 3, 4, 5, and 6, and adjusted in a manner similar to the device proper. The belt is then taken off the woman, the device unfastened and removed. It is then opened out flat and laid down on the waist lining or paper. Figs. 3, 4, 5, and 6 show the device as it will appear when opened out ready for marking the pattern.

In order to procure a pattern perfect in every minute detail, and one from which a dress or other garment can be made to fit perfectly without any of the tedious "trying on," "fitting," bother, and trouble, it is only necessary to draw a pencil along the edge of the proper parts of the device, the line made by the pencil being exactly where the seam of the garment must be in order to secure the perfect "fit," "hang," and "set" of the garment.

In cutting the cloth allowance must be made for the cloth outside of the seam—say half or three-quarters of an inch, as the case might be. Heretofore the method of cutting garments or patterns for them has been to cut the cloth or pattern and "allow for seam."

Actual observation has shown me that when people are told to "allow half an inch for seam," their allowances have varied from an eighth of an inch to an inch, and sometimes more. My invention does away with this trouble, as the "set" of the garment will not be affected by the allowances for seam. My device gives every seam-line correct, and no change need be made in any of them in any way.

In marking out the pattern of a sleeve the device is opened out flat and a pencil drawn along the edge of the proper parts. A mark is made at I, Fig. 5, to indicate where the sleeve is to be sewed in the body of the garment, which mark must come exactly to the shoulder-seam in the garment. If desired, the sleeve can be used independent of the body, but, if so, it is not so easy to define the place at which the sleeve is to be sewed in the garment.

The waist-strip $e$ of the front frames of the fitting device is made in sections for the purpose of closing the latter, or making the waist-strap continuous when the fitting device is on the person, and to open said strap when the said frames are disconnected, to permit them to yield and lie flat for marking the pattern.

It will be noted that the contour-straps $a^x$ on the front frames for the armholes are made up of sections or pieces, one of which, $a^{15}$, is provided with a series of studs, $a^{16}$, for engagement with section $a^{14}$ of said strap $a^x$, as shown more plainly in Fig. 6. By shifting the section $a^{14}$ to different studs, $a^{16}$, different shapes of armholes can be obtained for different persons.

What I claim is—

1. A measuring and fitting device comprising a series of separable frames or sections, each composed of separately and independently adjustable flexible straps pivoted one to the other in triangular form throughout the sections, and means for securing the straps in their adjusted position, whereby said sections may be adjusted to fit the figure of the individual under measurement, and then laid flat upon the goods to be cut, substantially as set forth.

2. A measuring and fitting device comprising a number of frames or sections separable from each other, and composed of separately and independently adjustable straps, all pivoted one with the other, and having openings and studs and fastening devices therefor, as and for the purpose set forth.

3. A measuring and fitting device comprising a number of frames or sections separable from each other, and composed of overlapping and single straps all pivoted together, and having openings, studs, and fastening catches for said studs, substantially as and for the purpose set forth.

4. A garment measuring and fitting device comprising a number of frames or sections separable from each other, and composed of separately and independently adjustable single and overlapping straps, one of the overlapping straps having a stud and the other or its mate having one or more openings, in combination with a fastening device or catch for said stud, substantially as and for the purpose set forth.

5. A garment measuring and fitting device comprising a number of frames or sections separable from each other and composed of separately and independently adjustable single and overlapping straps, one strap of the overlapping straps having a loop or keeper and a stud, and the other or its mate having one or more openings for engagement with said stud, in combination with a fastening spring-catch, one end of which is secured to the loop and the other engages with said stud, substantially as set forth.

6. In a measuring and fitting device composed of separable sections, the combination of flexible waist and bust straps, and the flexible adjustable dart-straps B C, substantially as shown and described.

7. In a measuring and fitting device composed of separable sections, the combination of bust and waist straps $s$ and $e$, each made in sections, adjustable dart-straps B and C, and brace-straps D E, as and for the purpose set forth.

8. In a measuring and fitting device composed of separable sections, the combination of bust and waist straps $s$ and $e$, each made in sections, and the adjustable dart straps B C, one end of each of which is pivoted to the waist strap and the other engaging with a fastening device on the bust-strap, substantially as and for the purpose set forth.

9. In a measuring and fitting device, the combination of bust-straps $s$, jointed between the darts, the adjustable dart-straps B C, and waist-strap e, made in sections adapted to be connected together and disconnected, as and for the purpose set forth.

10. A measuring and fitting device composed of separable sections or frames having separately and independently adjustable flexible contour, outline, dart, and bracing straps pivoted one to the other, in combination with belt $a$, substantially as and for the purpose set forth.

11. In a garment measuring and fitting device composed of separable sections made up of pivoted or swiveled straps, the armhole strap $a^\times$, composed of sections, one of which has a series of studs, $a^{16}$, for engagement with holes in one of the other sections, as and for the purpose set forth.

12. In a garment and fitting device formed of straps overlapping each other, the combination of studs, $k^\times$, having lateral openings $k^{11}$, the loop or keeper $h^\times$, and spring catch or fastener $n^\times$, having pin $n^{13}$, substantially as and for the purpose set forth.

13. A measuring and fitting device composed of separable sections made up of adjustable straps swiveled or pivoted together by eyelets $p^{12}$, in combination with the fastening-springs A, substantially as and for the purpose set forth.

14. A measuring and fitting device composed of separable sections or frames having separately and independently adjustable flexible contour, outline, dart, and bracing straps pivoted one to another in triangular form throughout the sections, substantially as shown and described.

WILLIAM BLOOMER POLLOCK.

Witnesses:
 HOWARD VAN COURT,
 EMMA BENNETT.